(12) United States Patent
Connor

(10) Patent No.: US 8,161,073 B2
(45) Date of Patent: Apr. 17, 2012

(54) CONTEXT-DRIVEN SEARCH

(75) Inventor: Robert A. Connor, Minneapolis, MN (US)

(73) Assignee: Holovisions, LLC, Forest Lake, MN (US)

( * ) Notice: Subject to any disclaimer, the term of this patent is extended or adjusted under 35 U.S.C. 154(b) by 150 days.

(21) Appl. No.: 12/799,934

(22) Filed: May 5, 2010

(65) Prior Publication Data

US 2011/0276599 A1    Nov. 10, 2011

(51) Int. Cl.
*G06F 17/00* (2006.01)
(52) U.S. Cl. ......... 707/791; 707/802; 707/822; 707/828
(58) Field of Classification Search ........... 707/600–681
See application file for complete search history.

(56) References Cited

U.S. PATENT DOCUMENTS

| | | | |
|---|---|---|---|
| 5,265,065 A | 11/1993 | Turtle |
| 5,418,948 A | 5/1995 | Turtle |
| 5,675,819 A | 10/1997 | Schuetze |
| 5,933,822 A | 8/1999 | Braden-Harder et al. |
| 5,963,940 A | 10/1999 | Liddy et al. |
| 6,026,388 A | 2/2000 | Liddy et al. |
| 6,032,145 A | 2/2000 | Beall et al. |
| 6,178,420 B1 | 1/2001 | Sassano |
| 6,185,576 B1 | 2/2001 | McIntosh |
| 6,321,224 B1 | 11/2001 | Beall et al. |
| 6,327,590 B1 | 12/2001 | Chidlovskii et al. |
| 6,510,406 B1 | 1/2003 | Marchisio |
| 6,519,585 B1 | 2/2003 | Kohli |
| 6,542,889 B1 | 4/2003 | Aggarwal et al. |
| 6,651,058 B1 | 11/2003 | Sundaresan et al. |
| 6,721,728 B2 | 4/2004 | McGreevy |
| 6,751,611 B2 | 6/2004 | Krupin et al. |
| 6,766,320 B1 | 7/2004 | Wang et al. |
| 6,901,399 B1 | 5/2005 | Corston et al. |
| 7,051,023 B2 | 5/2006 | Kapur et al. |
| 7,113,943 B2 | 9/2006 | Bradford et al. |
| 7,231,343 B1 | 6/2007 | Treadgold et al. |
| 7,231,379 B2 | 6/2007 | Parikh et al. |
| 7,260,567 B2 | 8/2007 | Parikh et al. |
| 7,287,025 B2 | 10/2007 | Wen et al. |
| 7,346,490 B2 | 3/2008 | Fass et al. |
| 7,366,711 B1 | 4/2008 | McKeown et al. |
| 7,370,056 B2 | 5/2008 | Parikh et al. |
| 7,383,258 B2 | 6/2008 | Harik et al. |
| 7,392,174 B2 | 6/2008 | Freeman |
| 7,398,201 B2 | 7/2008 | Marchisio et al. |
| 7,428,529 B2 | 9/2008 | Zeng et al. |
| 7,440,941 B1 | 10/2008 | Borkovsky et al. |
| 7,444,325 B2 | 10/2008 | Khandelwal et al. |
| 7,475,063 B2 | 1/2009 | Datta et al. |
| 7,487,094 B1 * | 2/2009 | Konig et al. .................. 704/270 |
| 7,496,561 B2 | 2/2009 | Caudill et al. |
| 7,499,934 B2 | 3/2009 | Zhang et al. |
| 7,526,425 B2 | 4/2009 | Marchisio et al. |

(Continued)

*Primary Examiner* — Isaac M Woo

(57) ABSTRACT

The invention disclosed herein is a context-driven search method comprising three main steps: having a user provide an input phrase that is used to search a collection of language-based information sources; identifying sets of substantially-equivalent expanded phrases that are relevant to the input phrase, wherein these expanded phrases appear in the collection of language-based information sources; and providing the user with set-specific summary information concerning some, or all, of these sets of substantially-equivalent expanded phrases. This innovative context-driven method provides search results that are driven, consolidated, and summarized by phrase context, so that users no longer have to wade through pages of results to pick out those entries that relate to the context in which they are interested.

7 Claims, 5 Drawing Sheets

U.S. PATENT DOCUMENTS

| | | |
|---|---|---|
| 7,536,408 B2 | 5/2009 | Patterson |
| 7,562,069 B1 | 7/2009 | Chowdhury et al. |
| 7,580,921 B2 | 8/2009 | Patterson |
| 7,580,929 B2 | 8/2009 | Patterson |
| 7,584,175 B2 | 9/2009 | Patterson |
| 7,599,914 B2 | 10/2009 | Patterson |
| 7,599,930 B1 | 10/2009 | Burns et al. |
| 7,624,007 B2 | 11/2009 | Bennett |
| 7,627,548 B2 | 12/2009 | Riley et al. |
| 7,630,978 B2 | 12/2009 | Li et al. |
| 7,630,980 B2 | 12/2009 | Parikh |
| 7,634,462 B2 | 12/2009 | Weyand et al. |
| 7,636,714 B1 | 12/2009 | Lamping et al. |
| 2006/0206474 A1 | 9/2006 | Kapur et al. |
| 2007/0043761 A1 | 2/2007 | Chim et al. |
| 2007/0100823 A1 | 5/2007 | Inmon |
| 2007/0106937 A1 | 5/2007 | Cucerzan et al. |
| 2008/0091670 A1 | 4/2008 | Ismalon |
| 2008/0114721 A1 | 5/2008 | Jones et al. |
| 2008/0215564 A1 | 9/2008 | Bratseth |
| 2008/0319962 A1 | 12/2008 | Riezler et al. |
| 2009/0024606 A1 | 1/2009 | Schilit et al. |
| 2009/0055394 A1 | 2/2009 | Schilit et al. |
| 2009/0083028 A1 | 3/2009 | Davtchev et al. |
| 2009/0193008 A1 | 7/2009 | De et al. |
| 2009/0216737 A1 | 8/2009 | Dexter |
| 2009/0240685 A1 | 9/2009 | Costello et al. |
| 2009/0259647 A1 | 10/2009 | Curtis |
| 2009/0276426 A1 | 11/2009 | Liachenko et al. |
| 2009/0282033 A1 | 11/2009 | Alshawi |
| 2009/0313233 A1 | 12/2009 | Hanazawa |
| 2009/0327269 A1 | 12/2009 | Paparizos et al. |

\* cited by examiner

CONTEXT-DRIVEN SEARCH

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

This invention relates to language-based search methods.

2. Review and Limitations of the Prior Art

Today's search engines do not produce search results that are driven, consolidated, and summarized by the major contextual uses of a search input phrase. As a result, search results can be a disorganized jumble of different contextual uses of the search input phrase. This forces a user to wade through pages of results (manually scanning titles, text snippets, and URLS) in order to pick out those entries that relate to the context for the phrase in which the user is interested. For example, if one enters the phrase "keep running" in the search box of today's dominant search engine, then one gets a page of results with a jumble of entries that bounce around from health and fitness . . . to musical songs . . . to computer programs . . . and even to nuclear power plants. There is no organization or summary of results by phrase context to guide the user. Entries with the desired context are randomly-sprinkled throughout several pages of results. This makes poor use of the user's time.

The designers of today's search engines are no doubt aware of this problem of context-jumbled searches. This is probably why they have developed features such as an interactive search box that provides a user with a pop-up menu of auto-completion search phrase options, in real time, as the user enters characters into the search box. This interactive search box is probably intended to help clarify the desired context for the input phrase in an effort to reduce the problem of context-jumbled searches. However, an interactive search box does not satisfactorily address the fundamental flaw of search engines that are not driven by search phrase context. For example, a search box that offers auto-completion options for words to the right of the characters that have been entered does not provide holistic variation of the entire input phrase. For example, it does not offer variation in word order or any other phrase variation that changes the characters that have already been entered. An interactive search box with a pop-up window is not a satisfactory means through which to refine search context and to provide holistic variation of the search input phrase. It is limited in terms of user time, screen space, and character entry order effects.

The prior art includes several different methods for creating variation in search queries, including not only interactive search boxes, but also automatic creation of variation in search queries. Examples in the prior art with methods for creating variation in search queries include the following: U.S. Pat. No. 5,265,065 (Turtle, 1993), U.S. Pat. No. 5,418,948 (Turtle, 1995), U.S. Pat. No. 5,675,819 (Schuetze, 1997), U.S. Pat. No. 5,933,822 (Braden-Harder et al., 1999), U.S. Pat. No. 5,963,940 (Liddy et al., 1999), U.S. Pat. No. 6,026,388 (Liddy et al., 2000), U.S. Pat. No. 6,185,576 (McIntosh, 2001), U.S. Pat. No. 6,321,224 (Beall et al., 2001), U.S. Pat. No. 6,327,590 (Chidlovskii et al., 2001), U.S. Pat. No. 6,510,406 (Marchisio, 2003), U.S. Pat. No. 6,519,585 (Kohli, 2003), U.S. Pat. No. 6,751,611 (Krupin et al., 2004), U.S. Pat. No. 6,766,320 (Wang et al., 2004), U.S. Pat. No. 7,051,023 (Kapur et al., 2006), U.S. Pat. No. 7,231,343 (Treadgold et al., 2007), U.S. Pat. No. 7,231,379 (Parikh et al., 2007), U.S. Pat. No. 7,260,567 (Parikh et al., 2007), U.S. Pat. No. 7,287,025 (Wen et al., 2007), U.S. Pat. No. 7,346,490 (Fass et al., 2008), U.S. Pat. No. 7,370,056 (Parikh et al., 2008), U.S. Pat. No. 7,398,201 (Marchisio et al., 2008), U.S. Pat. No. 7,428,529 (Zeng et al., 2008), U.S. Pat. No. 7,440,941 (Borkovsky et al., 2008), U.S. Pat. No. 7,475,063 (Datta et al., 2009), U.S. Pat. No. 7,536,408 (Patterson, 2009), U.S. Pat. No. 7,562,069 (Chowdhury et al., 2009), U.S. Pat. No. 7,580,921 (Patterson, 2009), U.S. Pat. No. 7,580,929 (Patterson, 2009), U.S. Pat. No. 7,584,175 (Patterson, 2009), U.S. Pat. No. 7,599,914 (Patterson, 2009), U.S. Pat. No. 7,599,930 (Burns et al., 2009), U.S. Pat. No. 7,630,978 (Li et al., 2009), U.S. Pat. No. 7,630,980 (Parikh, 2009), U.S. Pat. No. 7,634,462 (Weyand et al., 2009), and U.S. Pat. No. 7,636,714 (Lamping et al., 2009), and U.S. Patent Application Nos. 20060206474 (Kapur et al., 2006), 20070106937 (Cucerzan et al., 2007), 20080091670 (Ismalon, 2008), 20080114721 (Jones et al., 2008), 20080215564 (Bratseth, 2008), 20080319962 (Riezler et al., 2008), 20090083028 (Davtchev et al., 2009), 20090193008 (De et al., 2009), 20090216737 (Dexter, 2009), 20090259647 (Curtis, 2009), and 20090327269 (Paparizos et al., 2009).

However, none of the prior art provides a context-driven search method whose results are driven, grouped, and summarized according to the major contextual uses of the search input phrase. Such a context-driven method would correct the context-related problems noted above, so that users would no longer have to wade through pages of results to pick out those entries for the context in which they are interested. The invention disclosed herein is a context-driven search method that directly addresses and solves these context-related problems with search methods in the prior art.

SUMMARY OF THIS INVENTION

The invention disclosed herein is a context-driven search method comprising three main steps: (1) having a user provide an input phrase that is used to search a collection of language-based information sources; (2) identifying sets of substantially-equivalent expanded phrases that are relevant to the input phrase, wherein these expanded phrases appear in the collection of language-based information sources; and (3) providing the user with set-specific summary information concerning some, or all, of these sets of substantially-equivalent expanded phrases. This innovative context-driven method provides search results that are driven, consolidated, and summarized by phrase context. As a result, users no longer have to wade through pages of results to pick out those entries that relate to the context in which they are interested.

INTRODUCTION TO THE FIGURES

These figures show an example of how this invention may be embodied, but they do not limit the full generalizability of the claims.

FIG. 3 shows the user entering an input phrase into the search box.

FIG. 4 shows four lines of set-specific summary information for the sets of substantially-equivalent expanded phrases that result from the input phrase.

FIG. 5 shows an optional added step displaying individual phrases or sources within the set of substantially-equivalent expanded phrases that is selected by the user.

DETAILED DESCRIPTION OF THE FIGURES

The following figures show one embodiment of this invention, but they do not limit the full generalizability of the claims.

Figure 1:
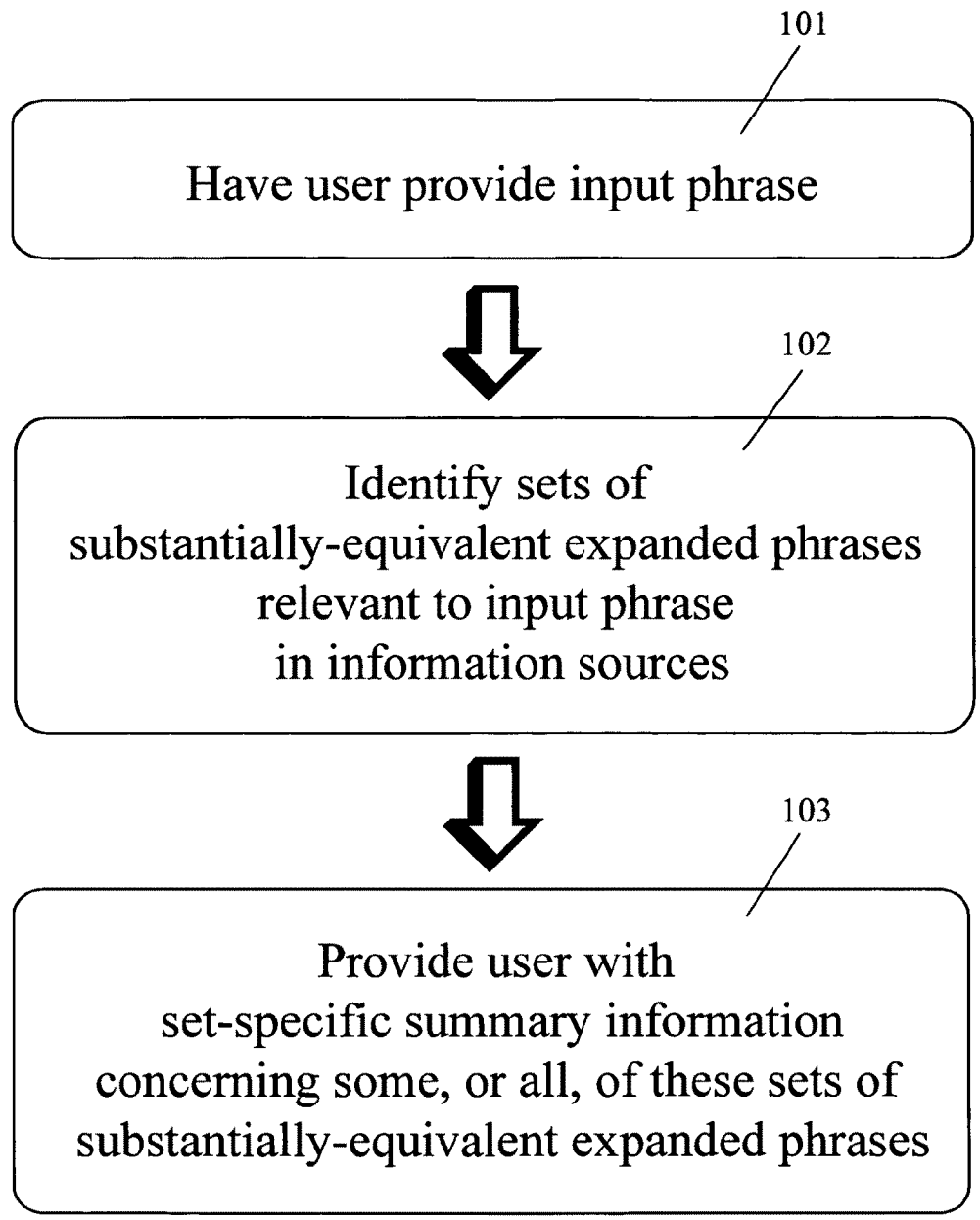
FIG. 1 shows a flow diagram with brief explanations for each of the three main steps in this context-driven search method.

FIG. 1 shows a flow diagram that provides a brief narrative explanation for each of the three main steps (101, 102, and 103) in the method of context-driven search that is disclosed herein. The first step 101 of this method involves having a user provide an input phrase that initiates a search through a collection of language-based information sources. An input phrase may be one or more words or other language-based character strings. In an example, the user may provide an input phrase by typing the phrase into a search box on a computer screen. In other examples, the user may provide an input phrase by speaking words into the microphone of a system with speech recognition, by highlighting certain words in text on a computer screen, by scanning a physical document, by gesture recognition methods, or by some other human-to-computer interface.

In an example, the collection of language-based information sources may be the pages that comprise the Internet. In other examples, the collection of language-based information sources may be selected from one or more sources in the group consisting of: books, journals, magazines, newspapers, reports, emails, datasets with text, voice transcriptions, and files. In an example, the collection of language-based information sources that is searched using this context-driven method may be a subset of a larger collection of language-based information sources that has been initially ranked and selected by applying some other search method.

FIG. 1 also shows a second step, 102, of this method that involves identifying sets of substantially-equivalent expanded phrases that are relevant to the input phrase that appear in the collection of language-based information sources. An expanded phrase that is relevant to an input phrase is defined as a phrase that includes the input phrase (or a minor variation thereof) plus one or more additional phrases. A set of substantially-equivalent expanded phrases is defined by the substantially-equivalent relationships among expanded phrases within that set. Specifically, within a set of substantially-equivalent expanded phrases, at least one additional phrase in each expanded phrase is identical to (or a minor variation of) at least one additional phrase in each of the other expanded phrases in that set.

In various examples, a "minor variation" of a certain phrase may be defined as a variation selected from one or more of the variations in the group consisting of:

Spelling variation: A phrase with words that are corrected or alternative spelling variations of the words comprising the certain phrase.

Grammar variation: A phrase with words that are grammatical variations (such as variation in tense, plurality, or voice) of the words comprising the certain phrase.

Modifier variation: A phrase with words that are the same as those comprising the certain phrase, except for the addition or deletion of grammatical articles (such as "a" or "an" or "the") or relatively-neutral modifiers (such as "very" or "especially").

Order variation: A phrase with words that are the same as those comprising the certain phrase, but are in a different word order.

Case variation: A phrase with words that are the same as those comprising the certain phrase, except for case variation (such as upper vs. lower case) in one or more letters in the certain phrase.

Punctuation variation: A phrase with the same words as those comprising the certain phrase, but with variation in punctuation or word contraction.

Phrase synonym: A phrase that is a "phrase synonym" for the certain phrase, wherein a "phrase synonym" is defined as a phrase that can be substituted for the certain phrase in the collection of language-based information sources without substantively changing meaning or creating a grammatical error in the language-based information sources.

Correlated phrase: A phrase that has been found to be highly-associated with the certain phrase by prior users based on analysis of previous search patterns.

In various examples, the positional relationship between the input phrase (or minor variation thereof) and the one or more additional phrases within an expanded phrase is selected from the group of relationships consisting of: one additional phrase preceding the input phrase (or minor variation thereof); one additional phrase following the input phrase (or minor variation thereof); one additional phrase preceding the input phrase (or minor variation thereof) and one additional following the input phrase (or minor variation thereof); and more than two additional phrases preceding or following the input phrase (or minor variation thereof). Also, in various examples, the additional phrase may be identified within a certain distance from the input phrase (or minor variation thereof), wherein this distance is measured by characters or words.

FIG. 1 also shows third step 103 of this method of context-driven search that provides the user with set-specific summary information concerning some, or all, of the sets of substantially-equivalent expanded phrases that are produced by the context-driven search. In an example, certain sets of substantially-equivalent expanded phrases that are more likely to be relevant to the user are selected for more prominent display. The selection of certain sets for more prominent display may be based on one or more factors selected from the group consisting of: the frequency with which expanded phrases in the set appear throughout the collection of language-based information sources; the average number of words or characters in the expanded phrases in the set; the average number of additional phrases in the expanded phrases in the set; the average commonality (or rarity) of words within the expanded phrases in the set; the position or proximity of the one or more additional phrases in the expanded phrases in the set relative to the input phrase (or minor variation thereof); the concentration or dispersion of expanded phrases in the set within and between information sources; and the frequency with which phrases in the set have appeared within a given search session, or in prior search sessions, by the present user or by other users.

In an example, the results from this context-driven search method may be in the form of several lines on a computer screen, wherein summary information for a given set of substantially-equivalent phrases is shown on a single line. In another example, the results from this context-driven search method may be in the form of several paragraphs on a computer screen, wherein summary information for a given set of substantially-equivalent phrases is shown in a single paragraph. In various examples, set-specific summary information (such as shown on a single line or in a single paragraph) may include: one expanded phrase from the set to conceptually represent all of the variations of substantially-equivalent phrases that comprise that set; the number of times that any expanded phrase in this set appears throughout the collection of language-based information sources; the number of different information sources that include one or more of the expanded phrases in this set; the number of times that prior users have explored detail on this set in previous searches; a measure of the degree of variation in phrase wording among expanded phrases within the set; or other summary indicators to help the user select among sets.

In an example, in step 103 in FIG. 1, each result for set-specific summary information concerning a set of substantially-equivalent expanded phrases provides the user with an option to explore more detailed information about the individual expanded phrases within a set, to explore more detailed information about the individual sources in which those expanded phrases appear, or both. For example, the results provided in step 103 may include one or more links which a user may click in order to see the individual expanded phrases within a set, the individual sources in which those expanded phrases appear, or both.

The method of context-driven search disclosed herein corrects a significant disadvantage of search engines in the prior art. Search engines that do not organize search results by context generate lists of search results that are jumbled and inefficient for users with respect to contextual use of the search phrase. Such engines in the prior art require a user to wade manually through a list of results in order to pick out only those entries that relate to the context of interest. Entries with a context of interest can be randomly mixed into several pages of search results that include contextual uses of the input phrase that are of no interest to the user.

For example, if one enters the phrase "keep running" into the search box of today's most popular search engine, then one gets a first page of results that have a jumble of entries that conceptually bounce around, in a relatively-random manner, among several unrelated contexts: health and fitness; musical songs; computer programs, and nuclear power plants. There is no organization by phrase context. There is no consolidation of results by context. The user, who probably is not interested in information on both nuclear power plants and musical songs, has to wade manually through the list, scanning source titles and text snippets in an effort to try to find entries with the particular context in which she or he is interested. Even more frustrating, the entries that are relevant to the desired context may be randomly-sprinkled throughout not only the first page of results, but throughout several subsequent pages as well.

The lack of organization by context in today's search engines makes poor use of a user's time. This disadvantage is directly addressed and corrected by the context-driven search method that is disclosed herein. This context-driven search method corrects this problem by automatically grouping and organizing search results by the contextual use of the input phrase in information sources. This context-driven search method helps the user to find those information sources that are most relevant to their desired context in an intuitive and efficient manner.

This context-driven search method also corrects a second, but related, disadvantage of search engines in the prior art. This problem relates to variation in wording. How can a search engine handle variation in wording in the search input phrase vs. wording in the information sources that are being searched? As discussed earlier in this section, variation in wording can include: spelling variation, grammar variation, modifier variation, order variation, case variation, punctuation variation, and phrase synonyms. If a search engine narrowly searches for information sources with only the input phrase that was entered into the search box, then the engine will likely fail to find important sources that contain minor variations on the input phrase. The context-driven search method that is disclosed herein corrects this problem by identifying sets of substantially-equivalent expanded phrases that are relevant to the input phrase.

Today's search engine designers are no doubt aware of the two problems identified above: (1) the lack of organization of search results with respect to contextual use of the input phrase; and (2) missing relevant results due to variation in wording in the search input phrase vs. wording in the information sources. This is probably why they have developed an interactive search box that provides a user with a pop-up menu of auto-completion options as the user enters characters into the search box from left to right. This interactive search box is probably intended to correct these two problems by prompting the user with a menu that: clarifies the desired context for the input phrase to reduce the problem of context-jumbled searches; and encourages the user to use frequently-used ("standard") key words instead of seldom-used ("non-standard") words to reduce the problem of missed sources due to word variation.

However, these problems have not been satisfactorily solved by an interactive search box. An interactive search box with a pop-up menu of auto-completion options does not satisfactorily address the fundamental flaw of search engines that are not driven by context. For example, an interactive search box with a pop-up menu of auto-complete options for words to the right of the characters that have been entered thus far by the user does not offer holistic variation of the entire input phrase. It does not offer variation in word order or any other phrase variation that changes the characters that have been previously entered when additional characters are entered. It would probably overwhelm the user to incorporate a wide range of holistic variation in the context of a search box with a pop-up menu. In contrast, the context-driven search method disclosed herein addresses this problem. It automatically identifies and groups sets of substantially-equivalent expanded phrases and presents the user with helpful summary-information concerning those sets. This all happens behind the scenes and does not overwhelm the user. Accordingly, the context-driven search method disclosed herein is a significant improvement over search engines in the prior art, even those with interactive search boxes.

The context-driven search method disclosed herein handles a wide variety of variation in input phrases and provides the user with an efficient, organized summary of sets of expanded phrases that conveys different contexts for the input phrase. Multiple results with information on substantially-equivalent expanded phrases are clearly and conveniently summarized for the user to review and to select the context that is of greatest interest. The user does not have to wade through a jumble of results in different contexts. The user can quickly see the top contexts in which the phrase is used. In an example, the user can click on the desired context to see individual results (by phase or by source) for that contextual usage of the input phrase.

Figure 2:
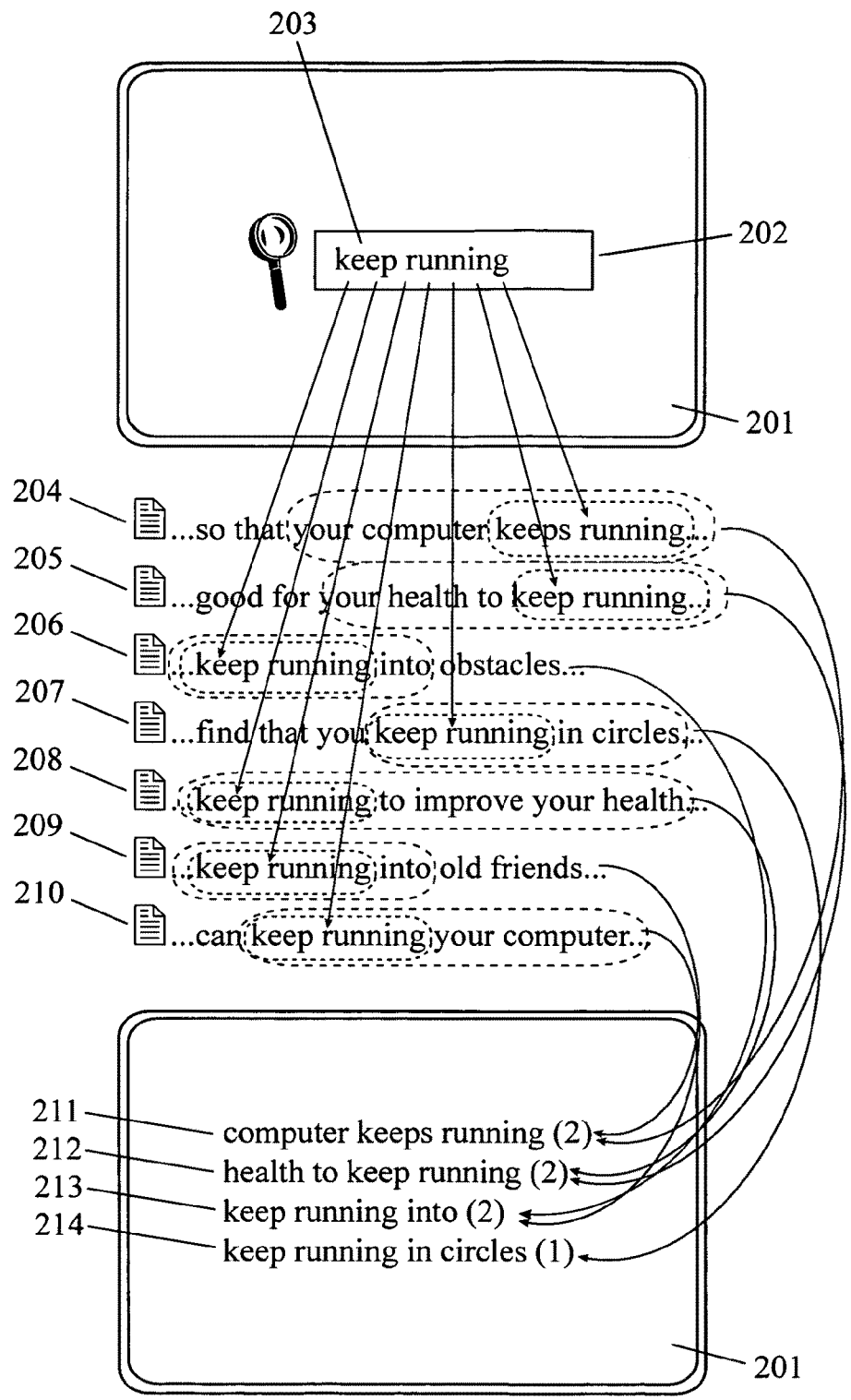
FIG. 2 shows a simple example from a system perspective of how this context-driven search method can work with a specific input phrase.

FIG. 1 provided a conceptual flow diagram of one embodiment of this method of context-driven search. FIG. 2 now shows a simple example of how this embodiment can work with a specific example of an input phrase. In the interest of simplicity, this example includes just a handful of language-based information sources. In actual practice, there would likely be a very large number of sources in the collection of language-based information sources. In an example, the collection of language-based information sources could include all pages on the internet.

The top portion of FIG. 2 shows a stylized computer screen 201 that displays a search box 202 into which a user has typed the input phrase "keep running" (that is labeled as 203). The middle portion of FIG. 2 shows that the system has identified seven expanded phrases, labeled 204-210, found in the collection of language-based information sources. As discussed earlier, each of these expanded phrases includes the input phrase (or a minor variation thereof) plus one or more additional phrases. In this simple example, there is only a handful of expanded phrases. In actual practice, there would likely be very large number of expanded phrases identified from a very large number of information sources. In this simple example, there is only one expanded phrase found in each of seven information sources. In other examples, there may be multiple expanded phrases found in each of multiple information sources.

In an example, identification of expanded phrases and grouping them together into sets of substantially-equivalent expanded phrases may be done by software. This software may be based on variations of the input phrase in accordance with the definition of "minor variation" that was provided earlier in this description. In this example, a grammatical variation in verb tense in the input phrase "keep running" is used to identify the expanded phrase 204 " . . . so that your computer keeps running . . . " Also in this example, expanded phrase 210 " . . . can keep running your computer . . . " includes the input phrase and also the additional phrase "computer," so it is grouped into the same set of substantially-equivalent expanded phrases as phrase 204. This identification and grouping of substantially-equivalent expanded phrases can occur behind the scenes from the perspective of the user. The user only has to see the useful results of this process that are displayed at the bottom of FIG. 2.

In this example, the collection of language-based information sources did not include the phrase "keep on trucking." In an example that would be more appealing to Grateful Dead fans, the phrase "keep on trucking" would be among the information sources. Ironically, the example herein would likely have included the phrase "keep on trucking" were it not for bothersome memory lapses on the part of the inventor.

The bottom portion of FIG. 2 shows the results of this context-driven search method based on the input phrase "keep running" that the user entered into search box 202. In this example, there are four lines, 211-214, in the results displayed on screen 201 at the bottom of FIG. 2. In this example, each line provides set-specific summary information for one of the four general contexts in which the input phrase is used in the collection of language-based information sources. Each context is associated with a set of substantially-equivalent expanded phrases. In another example, there may be four paragraphs, one for each context or set of expanded phrases.

In this simple example, the set-specific summary information for each set includes: a representative phrase for the set; and the frequency with which any expanded phrase in that set was found in the collection of language-based information sources. In other examples, set-specific summary information may also include: the number of different information sources that include one or more of the expanded phrases in this set; the number of times that prior users have explored detail on this set in previous searches; a measure of the degree of variation in phrase wording among expanded phrases within the set; or other summary indicators.

As an extension of the basic three-step method disclosed herein, each of the set-specific summary results, 211-214, may include links that the user can click to obtain additional information on the individual expanded phrases comprising that set, the individual information sources with expanded phrases from that set, or both.

At first glance, it might appear that this is a two-step search process for a user to get to the individual sources and, as such, that it would be less efficient than the "one-step" process used by current search engines. One might argue that with current search engines, all one has to do is to enter a search phrase and one immediately gets a listing of individual sources.

However, closer analysis considering the role of context shows that this context-driven search method is actually more efficient than current search engines. For reasons that we discussed above, current search engines that do not have an interactive search box have serious problems with respect to providing context-relevant results and capturing all relevant sources with word variation. In contrast, this context-based search engine directly addresses and corrects these problems. Further, even current search engines that do have an interactive search box with auto-completion options ultimately require the user to engage in a three-step process. First, the user must interact with the search box and auto-complete options to enter an input phrase. Second, the user inputs the phrase and the algorithm produces a list of search results. Third, the user must wade through the search results (which are not organized by context) to pick out only those results with a relevant context for the search phrase. In contrast, this context-based search engine provides context-relevant and variation-tolerant results in only two steps. In both cases, the context-based search method is more efficient for the user.

Figure 3:
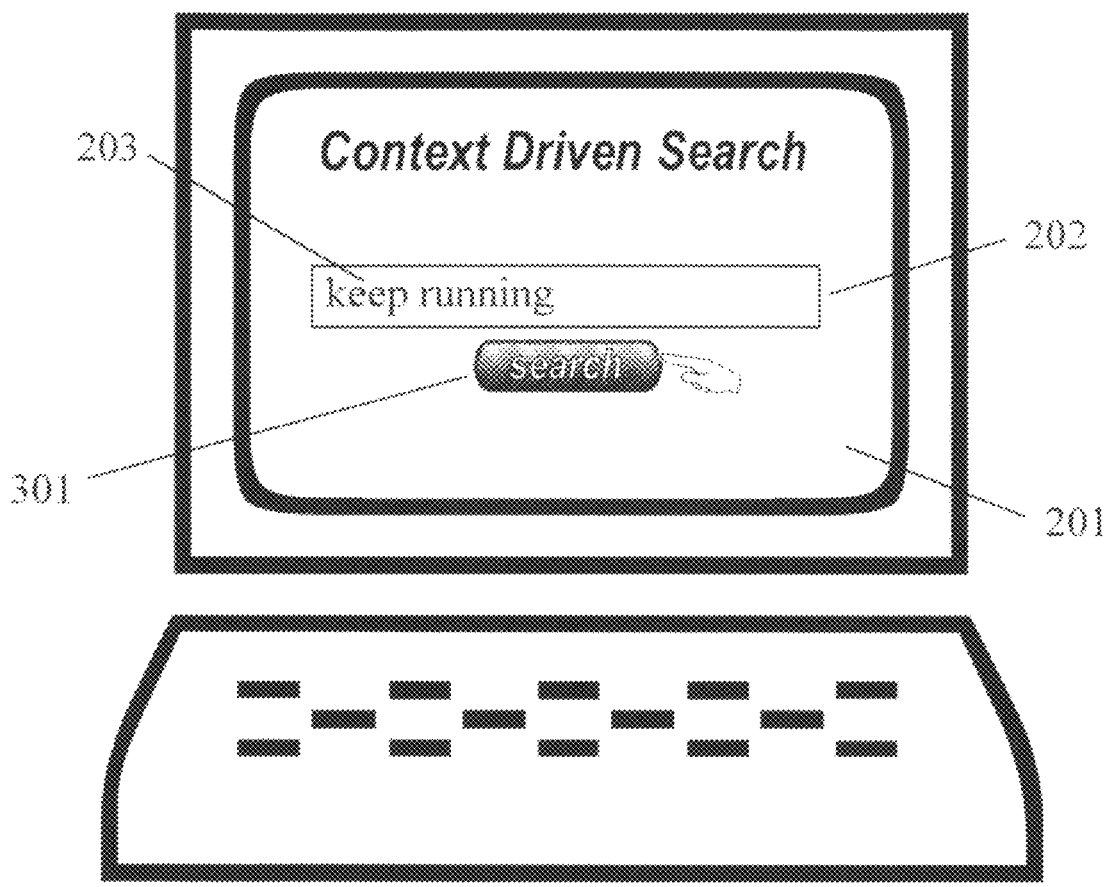
FIGS. 3 through 5 show this same example from a user perspective.
Figure 4:
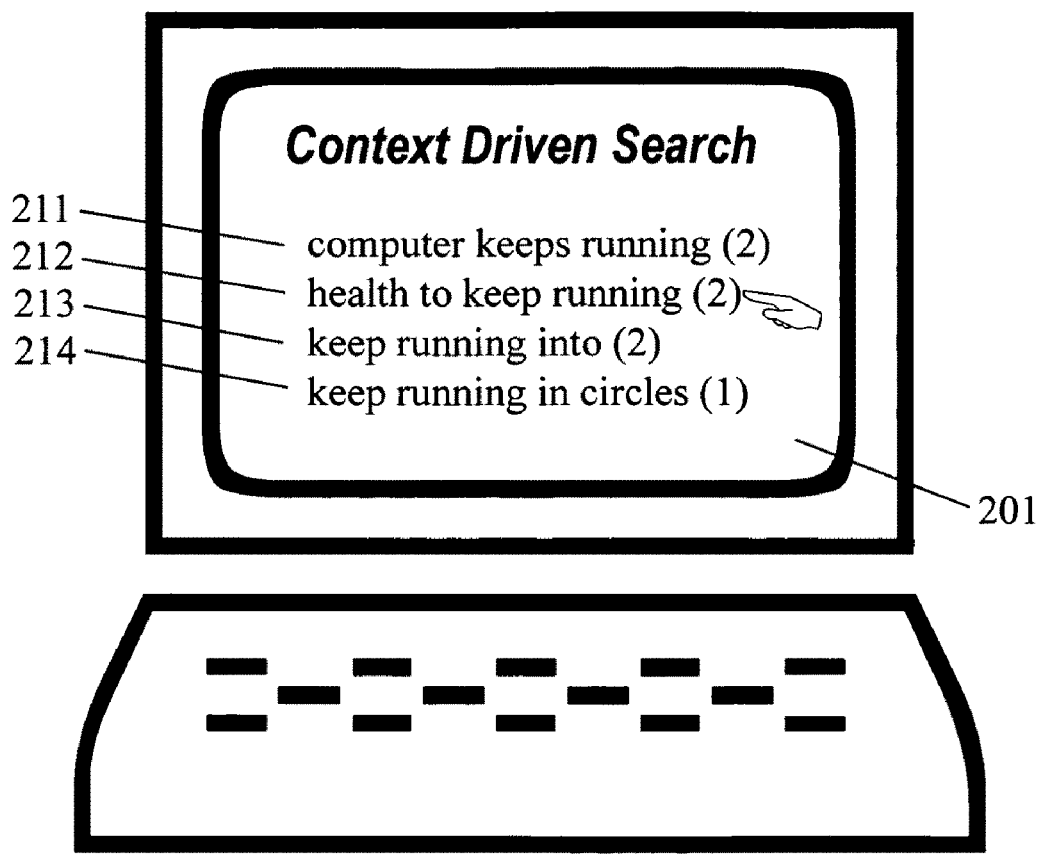
Figure 5:
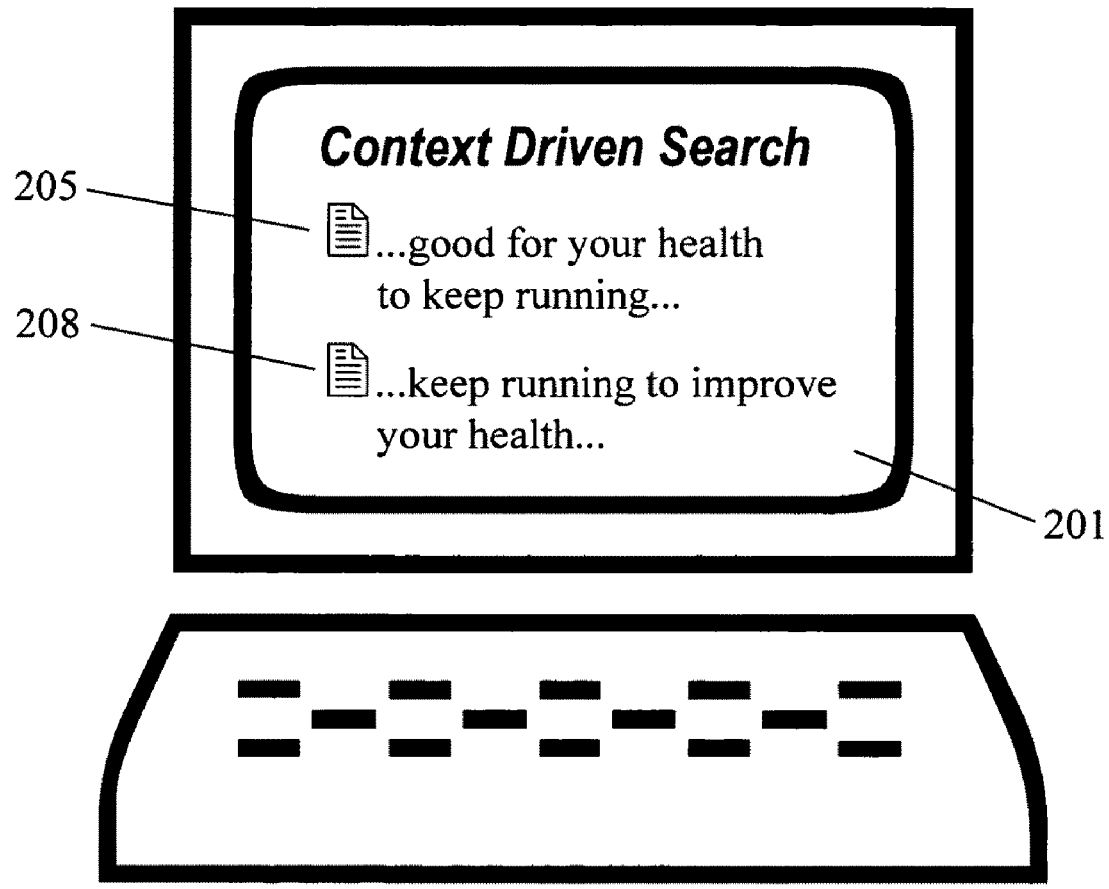

FIGS. 3 through 5 provide a user perspective on how this method of context-driven search works. The specific example is the same as that given in FIG. 2, but it is now shown from the user's perspective rather than from a system perspective. In FIG. 3, the user is presented with the "Context Driven Search" home page on screen 201. This page includes search box 202. In this example, the user types the input phrase "keep running" 203 into search box 202. The finger icon in FIG. 3 indicates that the user clicks on a "search" button 301 after entering the input phrase.

In this example, the process of identifying and grouping expanded phrases that was shown in FIG. 2 occurs behind the scenes and is not shown to the user. From the user's perspective, the next thing that happens after clicking on "search" button 301 in FIG. 3 is the appearance of the results of the context-driven search as shown in FIG. 4. In particular, FIG. 4 shows four lines, each of which provides set-specific summary information for one of the four sets of substantially-equivalent expanded phrases, 211-214. These sets were identified and grouped based on the expanded phrases that were found in the collection of language-based information sources. For example, these results on screen 201 in FIG. 4 show the user that there were two expanded phrases associated with set 211 "computer keeps running" and two expanded phrases associated with set 212 "health to keep running."

The transition of this example from FIG. 4 to FIG. 5 extends beyond the three basic steps in the context-driven search method disclosed herein. This transition shows an optional additional step in which the user has the option of exploring the individual expanded phrases or information sources within a set of substantially-equivalent expanded phrases. In the example shown in FIG. 4, the finger icon pointing to set 212 indicates that the user clicks on 212 "health to keep running" for more information about use of the input phrase in the context of "health." The user is particularly interested in running in the context of health. This click opens up the detailed results shown in FIG. 5 for phrases or sources within the set of substantially-equivalent expanded phrases labeled "health to keep running." In this example, these results include expanded phrases 205 " . . . good for your health to keep running . . . " and 208 " . . . keep running to improve your health . . . ". Clicking, in turn, on one of these links may open up a window to the appropriate original source.

I claim:

1. A context-driven search method comprising:
   having a user provide an input phrase that is used to search a collection of language-based information sources, wherein a phrase is one or more words or other language-based character strings;
   identifying sets of substantially-equivalent expanded phrases that are relevant to the input phrase, wherein these expanded phrases appear in the collection of language-based information sources, wherein an expanded phrase relevant to an input phrase is defined as a phrase that includes the input phrase, or a minor variation thereof, plus one or more additional phrases; and wherein this minor variation is defined as a variation selected from one or more of the variations in the group consisting of: a phrase with words that are corrected or alternative spelling variations of the words comprising the input phrase; a phrase with words that are grammatical variations (such as variation in tense, plurality, or voice) of the words comprising the input phrase; a phrase with words that are the same as those comprising the input phrase, except for the addition or deletion of grammatical articles (such as "a" or "an" or "the") or relatively-neutral modifiers (such as "very" or "especially"); a phrase with words that are the same as those comprising the input phrase, but are in a different word order; a phrase with words that are the same as those comprising the input phrase, except for case variation (such as upper vs. lower case) in one or more letters in the input phrase; a phrase with the same words as those comprising the input phrase, but with variation in punctuation or word contraction; a phrase that is a phrase synonym for the input phrase, wherein a phrase synonym is defined as alternative phrase that can be substituted for an original phrase in the collection of language-based information sources without substantively changing meaning or creating a grammatical error in the language-based information sources; and a phrase that has been found to be highly-associated with the input phrase based on analysis of previous search patterns; and
   providing the user with set-specific summary information concerning some, or all, of these sets of substantially-equivalent expanded phrases.

2. A context-driven search method comprising:
   having a user provide an input phrase that is used to search a collection of language-based information sources, wherein a phrase is one or more words or other language-based character strings;
   identifying sets of substantially-equivalent expanded phrases that are relevant to the input phrase, wherein these expanded phrases appear in the collection of language-based information sources, wherein an expanded phrase relevant to an input phrase is defined as a phrase that includes the input phrase, or a minor variation thereof, plus one or more additional phrases, wherein at least one additional phrase in each expanded phrase in a given set of substantially-equivalent expanded phrases is identical to, or a minor variation thereof, at least one additional phrase in each of the other expanded phrases in that set, and wherein this minor variation is defined as a variation selected from one or more of the variations in the group consisting of: a phrase with words that are corrected or alternative spelling variations of the words comprising the additional phrase; a phrase with words that are grammatical variations (such as variation in tense, plurality, or voice) of the words comprising the additional phrase; a phrase with words that are the same as those comprising the additional phrase, except for the addition or deletion of grammatical articles (such as "a" or "an" or "the") or relatively-neutral modifiers (such as "very" or "especially"); a phrase with words that are the same as those comprising the additional phrase, but are in a different word order; a phrase with words that are the same as those comprising the additional phrase, except for case variation (such as upper vs. lower case) in one or more letters in the additional phrase; a phrase with the same words as those comprising the additional phrase, but with variation in punctuation or word contraction; a phrase that is a phrase synonym for the additional phrase, wherein a phrase synonym is defined as alternative phrase that can be substituted for an original phrase in the collection of language-based information sources without substantively changing meaning or creating a grammatical error in the language-based information sources; and a phrase that has been found to be highly-associated with the additional phrase based on analysis of previous search patterns; and
   providing the user with set-specific summary information concerning some, or all, of these sets of substantially-equivalent expanded phrases.

3. The input phrase and one or more additional phrases in claim 1: wherein the positional relationship between the input phrase (or minor variation thereof) and the one or more additional phrases within an expanded phrase is selected from the group of relationships consisting of: one additional phrase preceding the input phrase (or minor variation thereof); one additional phrase following the input phrase (or minor variation thereof); one additional phrase preceding the input phrase (or minor variation thereof) and one additional following the input phrase (or minor variation thereof); and more than two additional phrases preceding or following the input phrase (or minor variation thereof); and wherein an additional phrase is within a certain distance from the input phrase (or minor variation thereof) and this distance is measured by characters or words.

4. The context-driven search method in claim 1 wherein set-specific summary information for a given set of substantially-equivalent expanded phrases consolidates information concerning these expanded phrases into a single result for the set so that the user can efficiently see the general types of contexts in which the input phrase, or minor variations thereof, are used throughout the collection of language-based information sources.

5. The context-driven search method in claim 1 wherein set-specific information provides the user with one or more options (such as by clicking on links) to see more detailed information about the individual expanded phrases within a set and/or to see more detailed information about the individual sources in which those expanded phrases appear.

6. The context-driven search method in claim 1: wherein certain sets of substantially-equivalent expanded phrases that are probably more relevant are selected for more prominent display to the user; and wherein this selection process is based on one or more factors selected from the group consisting of: the frequency with which expanded phrases in the set appear throughout the collection of language-based information sources; the average number of words or characters in the expanded phrases in the set; the average number of additional phrases in the expanded phrases in the set; the average commonality (or rarity) of words within the expanded phrases in the set; the position or proximity of the one or more additional phrases in the expanded phrases in the set relative to the input phrase (or minor variation thereof); the concentration or dispersion of expanded phrases in the set within and between information sources; and the frequency with which phrases in the set have appeared within a given search session, or in prior search sessions, by the present user or by other users.

7. The context-driven search method in claim 1 wherein: the language-based information sources are selected from one or more sources in the group consisting of webpages, documents, books, journals, newspapers, reports, and emails; and wherein the collection of language-based information sources that is searched using this method is a subset of a larger collection of language-based information sources selected by first applying some other search method.

* * * * *